United States Patent [19]

Kelly et al.

[11] Patent Number: 5,714,740
[45] Date of Patent: Feb. 3, 1998

[54] MICROWAVE BACON COOKER DEVICE AND METHOD

[75] Inventors: Roger L. Kelly, Eau Claire; Brent W. Dressel, Elk Mound, both of Wis.

[73] Assignee: National Presto Industries, Inc., Eau Claire, Wis.

[21] Appl. No.: 719,552

[22] Filed: Sep. 25, 1996

[51] Int. Cl.$^6$ .................................................. H05B 6/80
[52] U.S. Cl. .................. 219/732; 219/733; 99/DIG. 44; 99/444; 99/449
[58] Field of Search ........................ 219/732, 733, 219/734, 725, 762, 763; 99/DIG. 14, 425, 444, 445, 446, 448, 449, 450

[56] References Cited

U.S. PATENT DOCUMENTS

| | | |
|---|---|---|
| D. 227,132 | 6/1973 | Kelly. |
| D. 260,221 | 8/1981 | Lee et al.. |
| D. 266,892 | 11/1982 | Ford. |
| D. 318,206 | 7/1991 | Watznauer. |
| D. 366,807 | 2/1996 | Fleck et al.. |
| D. 370,825 | 6/1996 | Parduhn ............................ D7/359 |
| 2,626,561 | 1/1953 | Fortune. |
| 2,924,168 | 2/1960 | Jamentz. |
| 3,713,379 | 1/1973 | Gordy. |
| 4,064,797 | 12/1977 | Forlani ............................. 99/426 |
| 4,074,102 | 2/1978 | Asen. |
| 4,112,833 | 9/1978 | Oda et al.. |
| 4,214,515 | 7/1980 | Kubiatowicz. |
| 4,249,464 | 2/1981 | Hansen. |
| 4,316,448 | 2/1982 | Dodge .............................. 126/424 |
| 4,343,978 | 8/1982 | Kubiatowicz. |
| 4,559,869 | 12/1985 | Hogan. |
| 4,848,217 | 7/1989 | Koziol ............................ 99/426 |
| 4,924,049 | 5/1990 | Dexter, Jr.. |
| 4,933,528 | 6/1990 | Barr. |
| 4,952,764 | 8/1990 | Harrington. |
| 4,996,404 | 2/1991 | Skerker et al. .................. 219/732 |
| 5,151,568 | 9/1992 | Rippley. |
| 5,552,285 | 9/1996 | Fleck et al.. |

FOREIGN PATENT DOCUMENTS

| | | | |
|---|---|---|---|
| 2 701 201 | 8/1994 | France ........................ 99/421 H |
| 2 703 235 | 10/1994 | France ........................ 99/421 R |

*Primary Examiner*—Philip H. Leung
*Attorney, Agent, or Firm*—Merchant, Gould, Smith, Edell, Welter & Schmidt, P.A.

[57] ABSTRACT

A microwave bacon cooker device and method are provided including a tray having a bottom and an upstanding side. Two inverted V-shaped racks are positioned in the tray for supporting bacon strips over the tray during cooking, each rack including first and second panels defining each V-shaped rack. The first and second panels further define a gap at an apex of the V-shape sized for receipt of a utensil for handling the bacon strips after cooking. Each rack is separable from the tray, and each rack is separable into first and second panels. The panels mount to one another with a post and socket arrangement. The separable racks and the separable panels facilitate cleaning and compact storage. The tray includes a rectangular inner perimeter for receiving the racks, and a handle surrounding an outer periphery of the tray defining a circular shape. Each panel of the rack includes air ventilation holes, and legs for supporting the panel above the bottom of the tray.

23 Claims, 6 Drawing Sheets

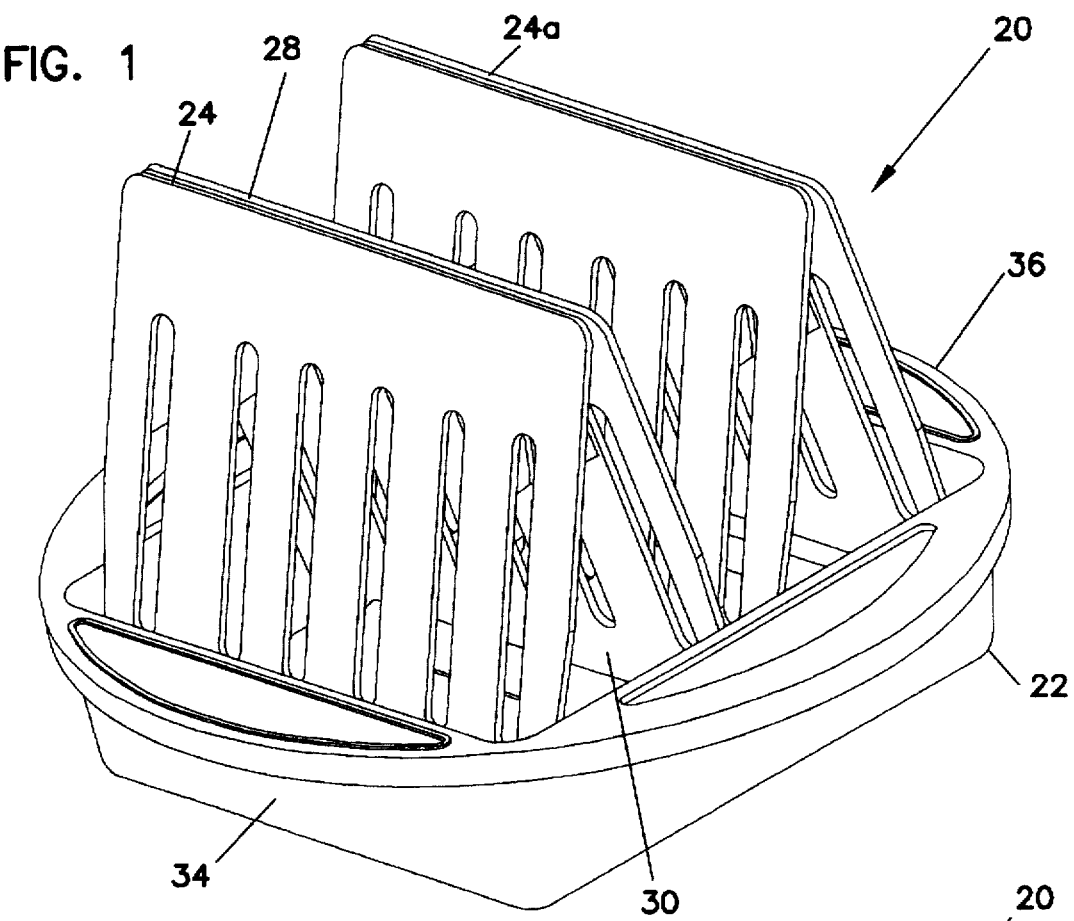
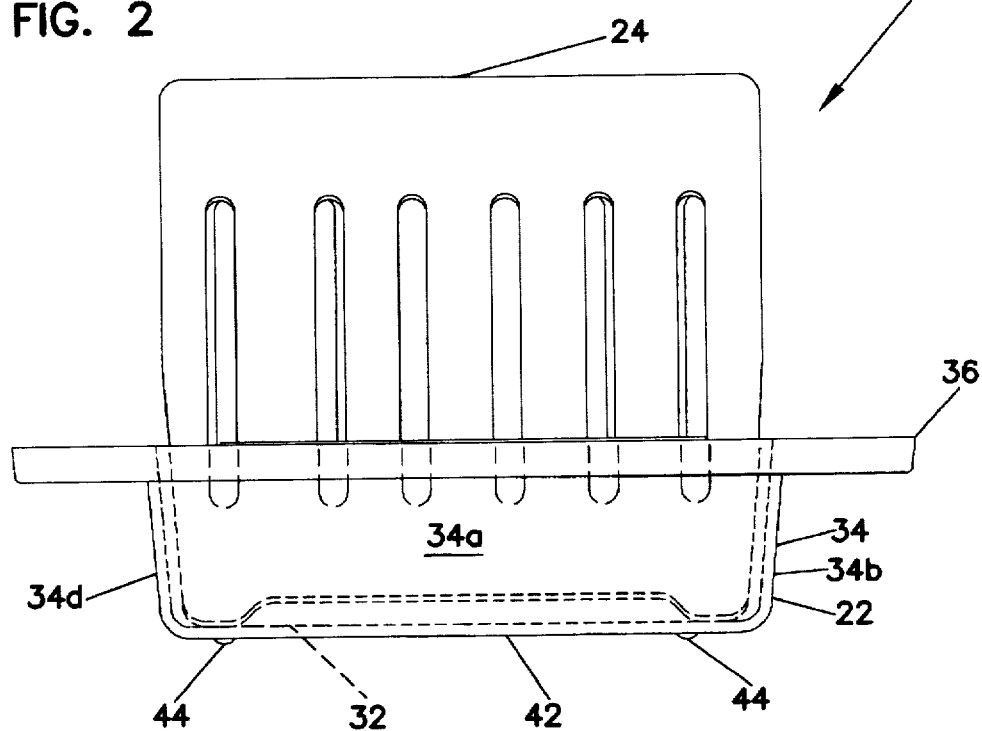

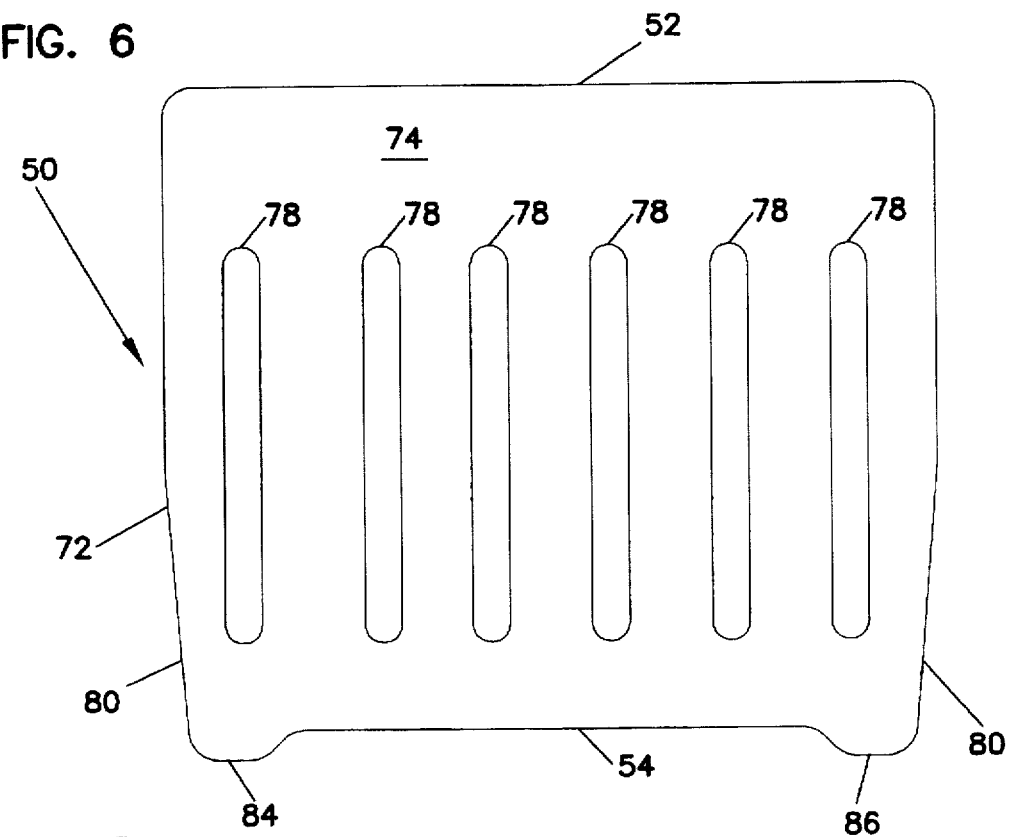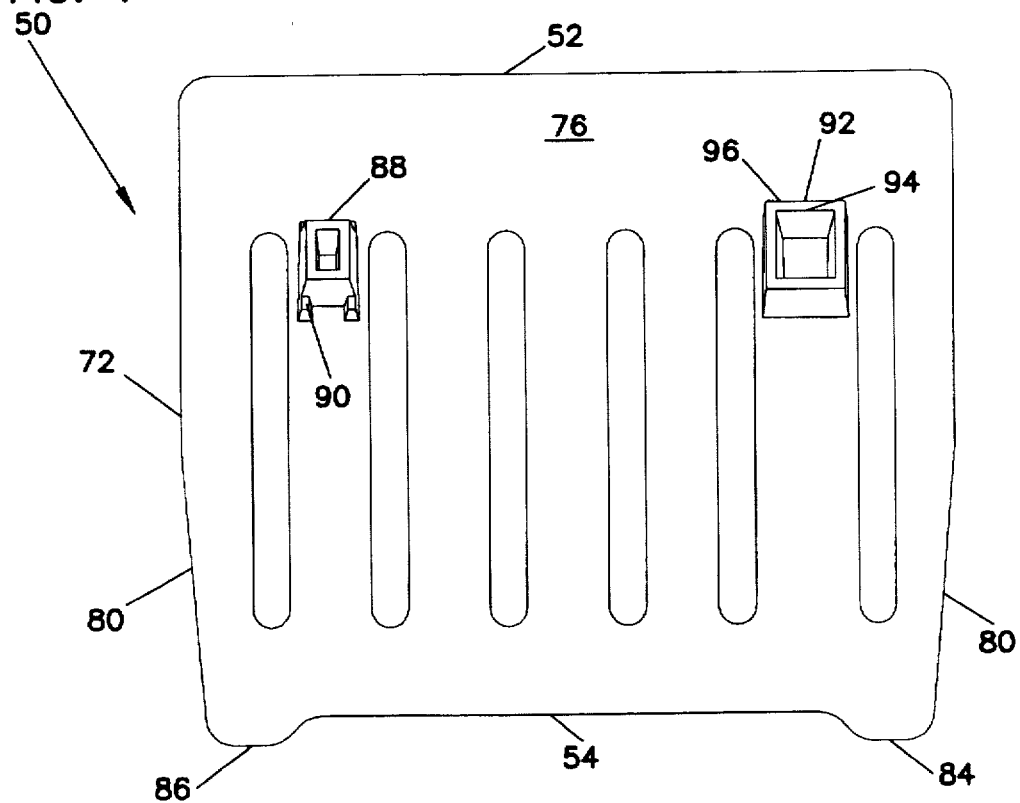

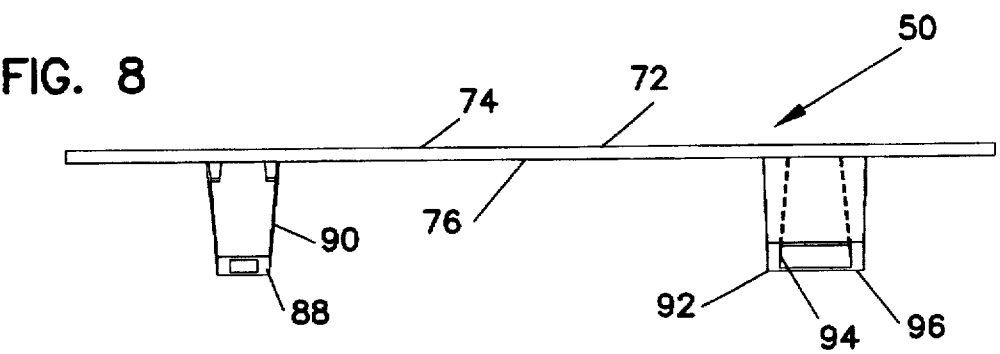
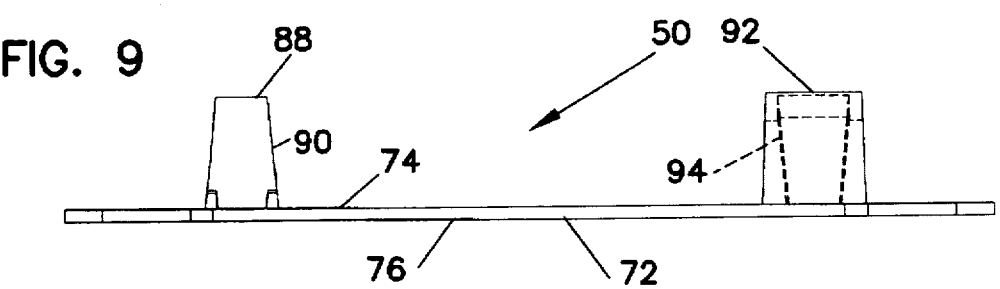
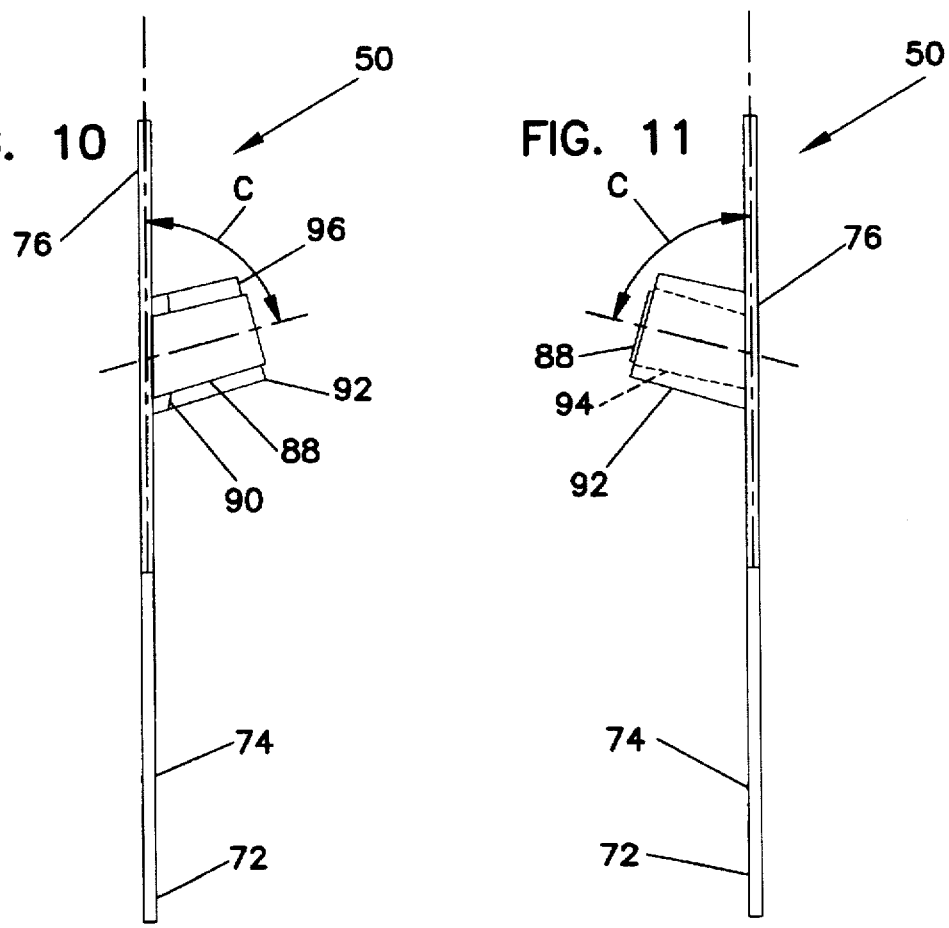

MICROWAVE BACON COOKER DEVICE AND METHOD

FIELD OF THE INVENTION

The present invention relates to devices and methods for cooking strips of bacon in a microwave oven.

BACKGROUND OF THE INVENTION

Uncooked strips of bacon can be prepared for eating by frying the bacon in a skillet or by cooking the bacon in a microwave oven. Microwave cooking is sometimes preferred due to the shorter time necessary to cook the bacon. Various microwave bacon cooker devices are known for holding the bacon during cooking including U.S. Pat. Nos. D318,206; D366,807; 4,112,833; 4,214,515; 4,343,978; 4,924,049; and 4,933,528.

Various concerns and problems arise in the case of cooking bacon in a microwave oven. The grease produced during cooking is both messy and hot. In the case of a cooking device which holds the bacon, it is desirable that the device be easy to manufacture and easy to use, while at the same time allowing for aesthetically pleasing, properly cooked, and good tasting bacon. Also, it is desirable that the cooking device be reusable and allow for compact storage. Ease of cleanup is a further concern. There is a need in the prior art for microwave bacon cooking devices and methods which address these and other concerns and problems.

SUMMARY OF THE INVENTION

One aspect of the present invention concerns a microwave bacon cooking device including an inverted V-shaped rack for supporting bacon strips over a horizontal surface during cooking. The rack includes first and second panels defining the V-shape, with the first and second panels further defining a gap at an apex of the V-shape where the gap is sized for receipt of a utensil, such as a knife, for handling the bacon strips after cooking. The microwave bacon cooking device further preferably includes a tray for receiving the inverted V-shaped rack and for collecting grease drippings. A preferred device includes two inverted V-shaped racks. Preferably each V-shaped rack is separable into at least two components. Preferably the two components are identical in configuration. It is further preferred that the V-shaped rack includes a plurality of legs which support the V-shaped rack on a horizontal surface. Preferably each of the first and second panels includes ventilation apertures therethrough.

A further aspect of the present invention concerns a microwave bacon cooking device including a tray which has a bottom and an upstanding side, and a rack for supporting bacon strips over the tray during cooking. The rack includes first and second panels where each panel has a major planar surface. The rack has two positions relative to the tray, a cooking position wherein each major surface is at an angle relative to the bottom of the tray and the rack has a inverted V-shape relative to the bottom of the tray, and a storage position wherein at least one major surface is generally parallel to the bottom of the tray. Preferably two racks are provided within the tray. Further, it is preferred that each rack is separable into at least two components which are stackable within the tray. Preferably the two components are identical.

Another aspect of the present invention concerns a microwave bacon cooker device including an inverted V-shaped rack for supporting bacon strips over a horizontal surface during cooking. The V-shaped rack has an apex over which the bacon is hung. The V-shaped rack has two panels defining the V-shape where each panel includes a plurality of ventilation apertures through the panel.

An additional aspect of the present invention concerns a microwave bacon cooker device including a tray having a bottom and an upstanding side. The upstanding side defines a generally rectangular shape having four corners. The tray has an outer peripheral handle surrounding the upstanding side and defining a generally circular shape. The device further including a rack received within the tray for supporting bacon strips above the bottom of the tray.

Another aspect of the present invention concerns a generally planar panel for use in microwave cooking of bacon including a body having a front major surface and an opposite facing back major surface. A post extends at an angle from the back major surface. A socket spaced from the post also extends from the same back surface at the same general angle as the post. The post and the socket cooperate with a respective socket and post of a second panel, thereby forming a V-shaped rack for use in supporting bacon during cooking.

A further aspect of the present invention concerns a method of microwave cooking bacon including the steps of hanging a bacon strip over an inverted V-shaped rack, the rack defining a gap at an apex of the V-shape. The method further includes cooking the bacon strip in a microwave oven, inserting a utensil into the gap below the cooked bacon strip, and lifting the bacon strip with the utensil from the rack.

An additional aspect of the present invention concerns a method of microwave cooking bacon including providing a device having a tray and an inverted V-shaped rack. The method further includes hanging a bacon strip over the V-shaped rack wherein the V-shaped rack has an upright vertical position relative to the tray with an apex of the V-shaped rack spaced from a bottom of the tray. The method further includes cooking the bacon strip in a microwave oven, removing the bacon strip from the rack, rotating the rack to a non-upright horizontal position, and positioning the rack in the horizontal position within the tray. The method further preferably includes separating the V-shaped rack into two components, and rotating one component relative to the other for positioning each component in the tray.

A further aspect of the present invention concerns a method of microwave cooking bacon including the steps of providing identical panels, mounting the panels together to form an inverted V-shaped rack, hanging a bacon strip over the rack, and cooking the bacon in the microwave. The method further preferably includes separating the V-shaped rack into two components and stacking the two components within a tray. The method further preferably includes providing two V-shaped racks, each rack being separable into two components, with the method further including stacking the four components within the tray.

BRIEF DESCRIPTION OF THE DRAWINGS

FIG. 1 is a perspective view of an embodiment of a microwave bacon cooker device according to the present invention.

FIG. 2 is a side elevational view of the device of FIG. 1, the opposite side being identical thereto.

FIG. 6 is an enlarged front side view of one panel of one of the racks of the device of FIG. 1, the other three panels of the device of FIG. 1 being identical thereto.

FIG. 7 is a back side view of the panel of FIG. 6.

FIG. 8 is a top view of the panel of FIG. 6.

FIG. 9 is a bottom view of the panel of FIG. 6.

FIG. 10 is a right side view of the panel FIG. 6.

FIG. 11 is a left side view of the panel of FIG. 6.

DETAILED DESCRIPTION OF THE PREFERRED EMBODIMENT

Figure 3:
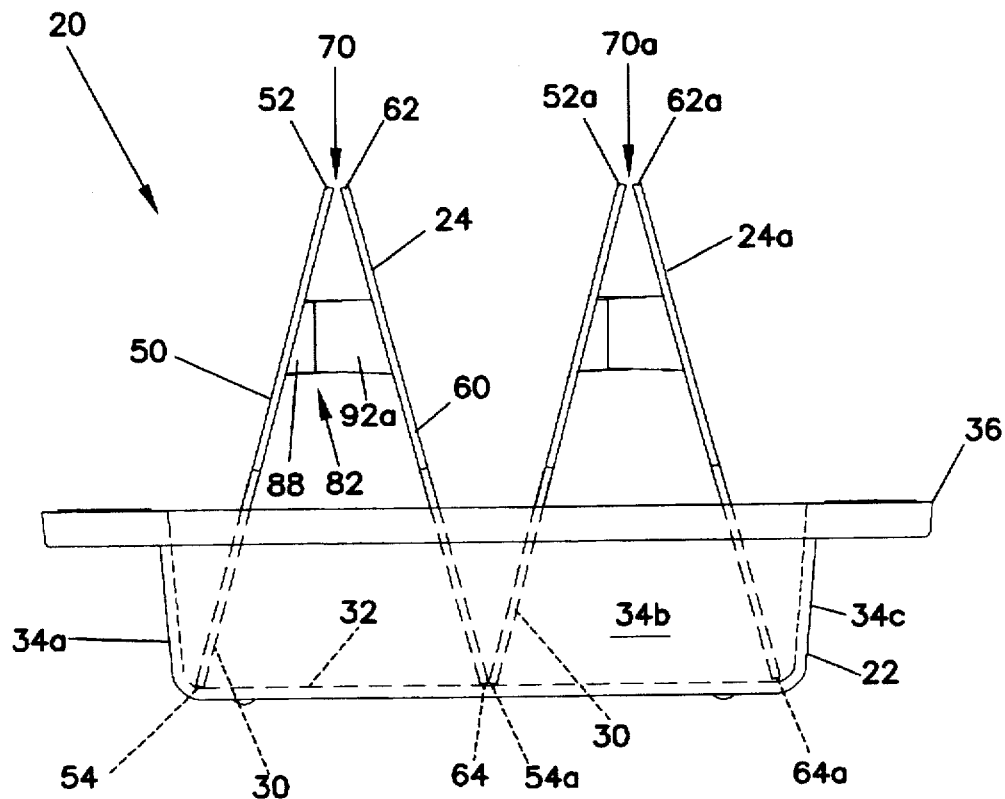
FIG. 3 is an end elevational view of the device of FIG. 1, the opposite end being identical thereto.

Referring now to FIGS. 1–5, an assembled microwave bacon cooker device 20 is shown including a tray 22 for catching grease drippings, and for supporting upright racks 24, 24a. As will be described in greater detail below, racks 24, 24a support bacon strips 100 (see FIG. 12) above tray 22 during exposure to microwaves in a microwave oven during cooking. Preferably, device 20 is reusable.

With continued reference to FIGS. 1–5, tray 22 includes a generally planar bottom 32 with an upstanding sidewall 34 including four sidewall portions 34a, 34b, 34c, 34d. Tray 22 further includes a handle 36 which preferably extends around tray 22. Handle 36 includes solid portions 38 and/or openings 40 as desired. A lower surface 42 of bottom 32 of tray 22 includes a plurality of feet 44 for supporting tray 22 on a horizontal surface, such as a countertop, or a surface within the microwave oven. Preferably, tray 22 is made from microwave transparent molded plastic, such as methylpentene.

Figure 4:
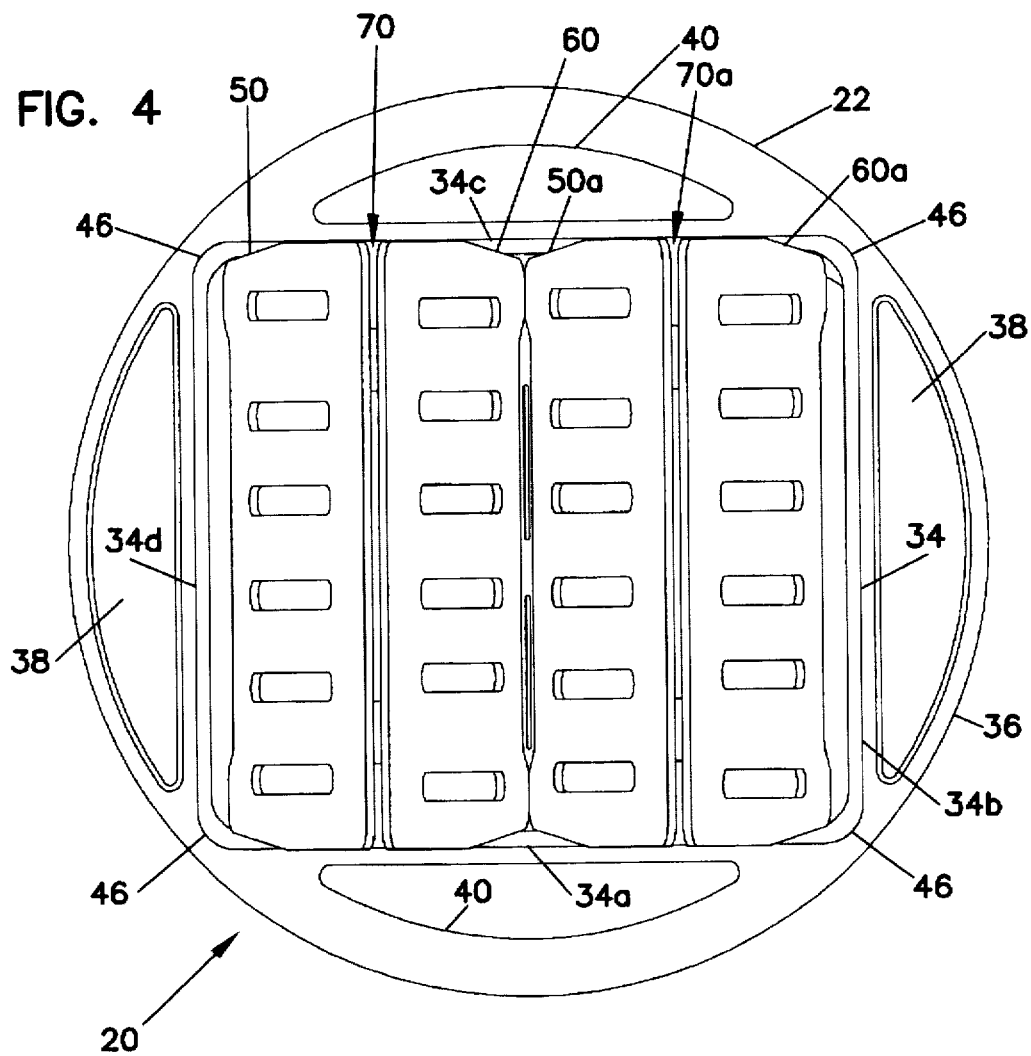
FIG. 4 is a top plan view of the device of FIG. 1.

With particular reference to FIG. 4, some preferred features of tray 22 are shown. Preferably, handle 36 defines a circular outer perimeter having a handle portion on all sides of tray 22. Having a handle portion on all sides of tray 22 allows for convenient grasping by the user no matter the orientation of tray 22 relative to the user. Handle portions on opposing sides of tray 22 allow the user to use two hands to handle device 20, if desired. Also, in the case of microwave ovens having rotatable turntables, a handle portion is always accessible by the user no matter the final position of tray 22 at the conclusion of cooking. A circular outer perimeter reduces the likelihood of a portion of tray 22 catching on a side wall of the microwave oven with a turntable during cooking.

FIG. 4 also illustrates a generally rectangular inner perimeter defined by sidewall 34. The generally rectangular inner perimeter provides four corners 46, each of which can provide a convenient grease pouring spout to pour grease from tray 22 following cooking. Corners 46 have a rounded shape to facilitate manufacture. Also, the generally rectangular shape of sidewall 34 cooperates with racks 24, 24a to support the lower ends of the racks in position during use. Preferably, racks 24, 24a are separate components from tray 22 to facilitate ease of cleaning. Further, separable racks 24, 24a from tray 22 also permit convenient storage by allowing for a reduction in the profile of device 20 by repositioning the racks relative to the tray or storing them separate from the tray. The rectangular shape of sidewall 34 is sized to hold racks 24, 24a during storage (see FIG. 13). Sidewall 34 has a slight outwardly tapered shape along the inner perimeter to facilitate manufacture.

Figure 12:
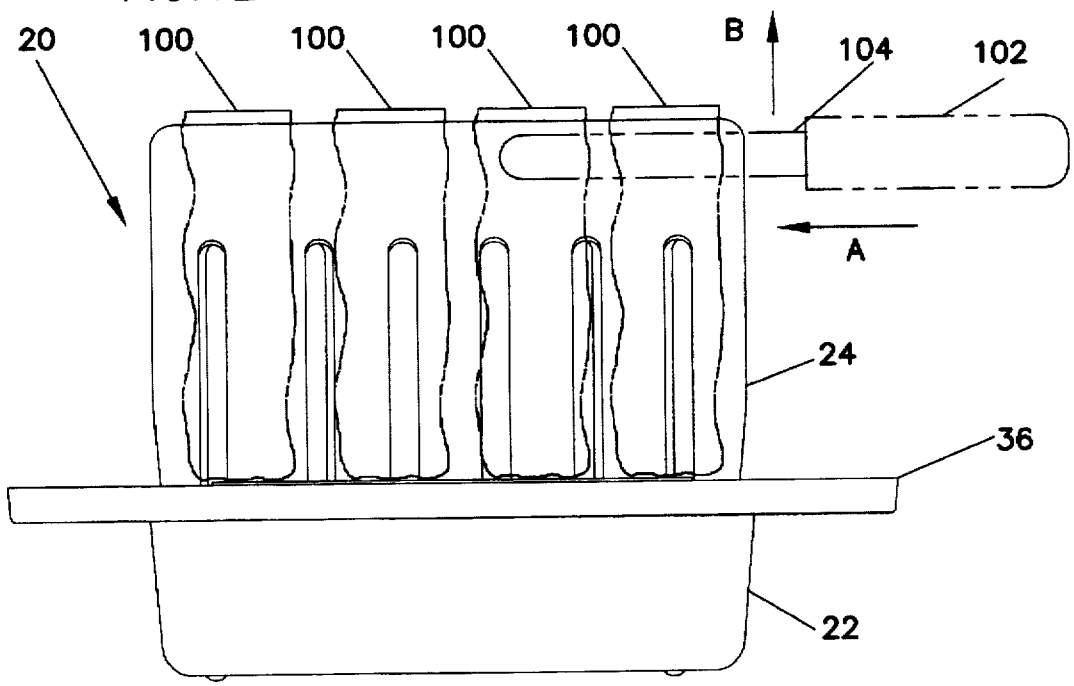
FIG. 12 is a side view of the device of FIGS. 1–5 showing bacon hanging on one of the racks and a utensil positioned to remove the bacon from the rack.

As noted above, device 20 includes two self-supporting racks 24, 24a. A single rack 24, or more than two racks are possible, as desired. Preferably, each rack 24, 24a is sized to hold three to five strips of bacon, draped over each rack, such as shown in FIG. 12. However, each rack can be used to cook as few as a single strip of bacon each. Preferably, racks 24, 24a are identical in construction. Each bacon strip can be draped over more than one rack 24, 24a, if desired, although each strip draped over only one rack is preferred. While use of racks 24, 24a with tray 22 is preferred, racks 24, 24a can be used with any microwave safe dish having an upstanding side to support the racks and catch the grease drippings.

With respect to rack 24, a generally inverted V-shape, or tent-shape, is defined wherein a closed end or apex 28 faces generally vertically upwardly during cooking, and an open end 30 faces generally vertically downwardly, with open end 30 being supported by bottom 32 of tray 22. Rack 24 includes two generally planar panels 50, 60 which define the V-shape. Top edges 52, 62 of each panel 50, 60 define apex 28 of rack 24. Preferably, a midpoint of each strip of bacon is positioned adjacent to apex 28 during cooking.

As shown in FIGS. 3 and 4, a small gap 70 is defined by the spaced apart top edges 52, 62 of panels 50, 60. Gap 70 is sized for receipt of a utensil, such as a knife 102 having a knife blade 104 which can be inserted within the V-shape defined by rack 24 in the direction of arrow A (FIG. 12) and then lifted upwardly in the direction of arrow B so as to lift off bacon strips 100 following cooking. Preferably, gap 70 is sized about 0.095 inches for receipt of knife blade 104.

Open end 30 of rack 24 is defined by spaced apart bottom edges 54, 64 of each respective panel 50, 60. Bottom edges 54, 64 engage bottom 32 of tray 22. Spaced apart bottom edges 54, 64 allow for rack 24 to be self-supporting in an upright position with or without bacon strips. While a planar sided V-shape is preferred, other inverted V-shapes for hanging the bacon are possible where the rack is self-supported by an open end, and the rack has an upper closed end for supporting a midpoint of the bacon strips.

Preferably, rack 24 is separable into at least two components to facilitate cleaning and storage. In the preferred embodiment shown, panel 50 is separable from panel 60. Further, it is preferred that panels 50, 60 be identical. Rack 24a is assembled from panels 50a, 60a which are preferably identical to panels 50, 60. In rack 24a, a similar gap 70a is formed by top edges 52a, 62a spaced from bottom 32 of tray 22, and bottom edges 54a, 64a are spaced apart and supported by bottom 32. During use, edges 52, 52a, 62, 62a, 54, 54a, 64, 64a are generally parallel.

Referring now to FIGS. 6–11, panel 50 of rack 24 is shown in greater detail. Preferably, panel 50 is a one piece construction, such as from microwave transparent molded plastic, for example methylpentene. Panel 50 is generally defined by a planar body 72 having a front major surface 74 and a back major surface 76, with elongated slots 78 therebetween. Slots 78 form ventilation apertures to allow for air passage during cooking. Panel 50 has a tapered lower end 80 for receipt in tray 22 which has the outwardly tapered shape to sidewall 34. Panel 50 further includes supporting legs 84, 86 which support a remainder of panel 50 above bottom 32 of tray 22. Preferably, legs 84, 86 support panel 50 above grease drippings in tray 22.

Panel 50 includes a mounting arrangement for connecting panel 50 to second panel 60. One preferred structure includes a post and socket arrangement wherein a post 88 extends from back surface 76 at a non-perpendicular angle C relative to planar body 72 (see FIGS. 10 and 11). On an opposite side of panel 50 also extending from back surface 76 at angle C is a socket 92. One preferred angle C is about 75° relative to planar body 72.

Post 88 is sized for receipt in the socket positioned on second panel 60. FIG. 3 shows post 88 of panel 50 engaged with a socket 92a of second panel 60. Similarly, socket 92 of panel 50 is sized for receipt of a post of panel 60 identical to post 88 of panel 50. Post 88 preferably includes a stop 90 around the post which is sized to engage an end of the socket extending from the opposing panel. Socket 92 includes a recess 94 sized for receipt of the post of the opposing panel, and a distal end 96 which engages the stop of the post of the opposing panel. Preferably, post 88 and recess 94 have a generally rectangular cross-section and each is slightly tapered in the longitudinal direction to facilitate manufacture and ease of use. In the case of two racks 24, 24a, preferably four identical panels are utilized wherein any two can be mated together to form each rack 24, 24a. This allows for ease of manufacture since only one panel configuration is needed. Also, ease of assembly is facilitated since a user can mate any two panels to form each rack.

Figure 13:
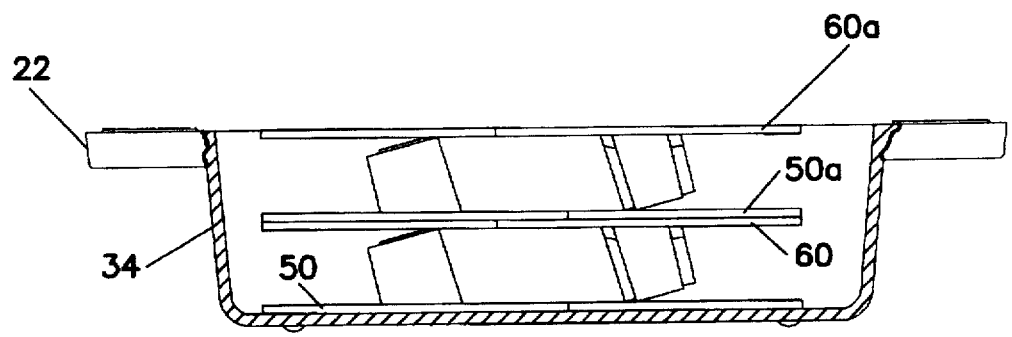
FIG. 13 is a side view of the device of FIGS. 1–5 showing the tray in partial cross-section and the racks in a dismantled and stacked arrangement within the tray for storage.
Figure 5:
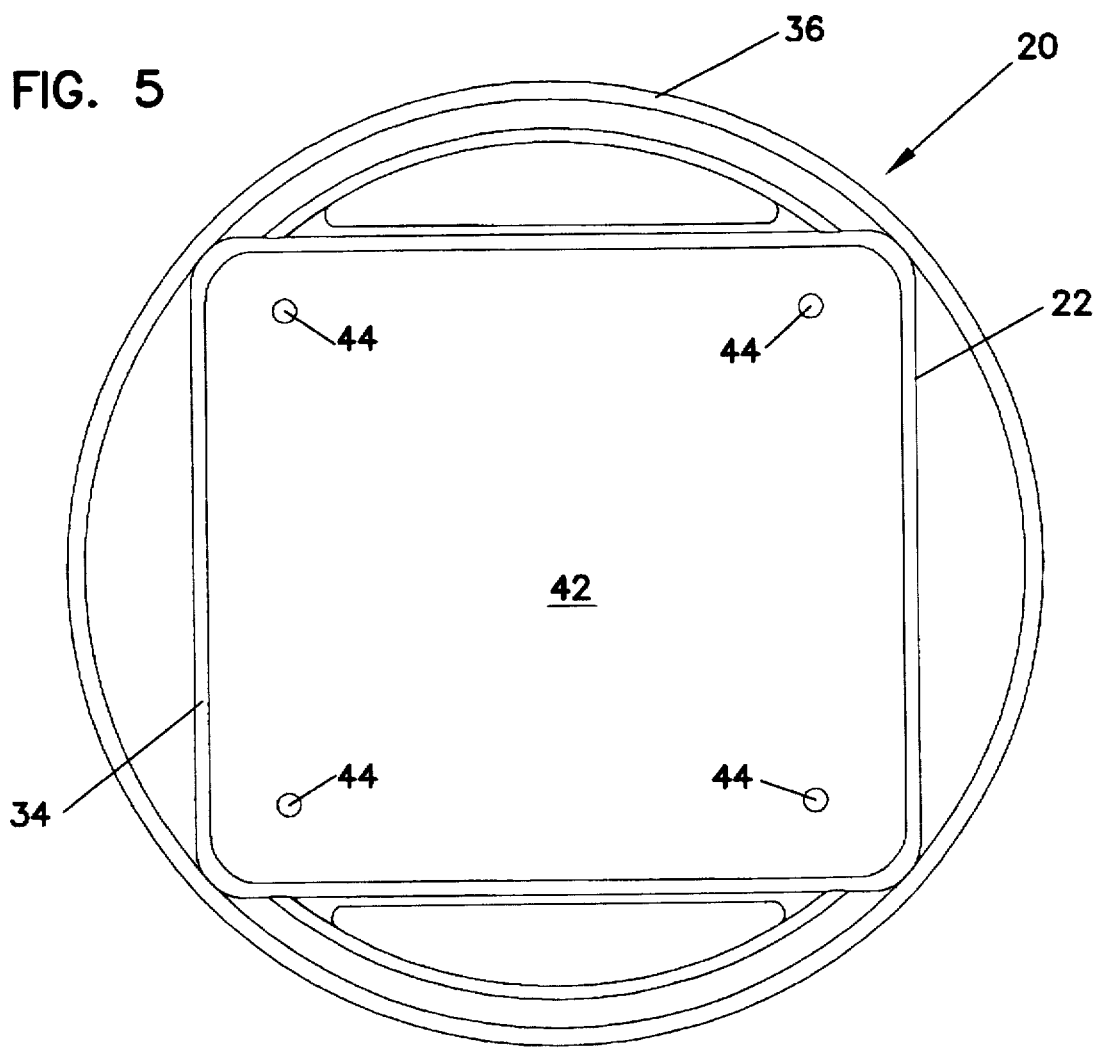
FIG. 5 is a bottom plan view of the device of FIG. 1.

Referring now to FIG. 13, four identical panels 50, 50a, 60, 60a are shown in a disassembled stacked arrangement which facilitates convenient storage. From their arrangement in FIGS. 1–4, each panel is separated from the opposing panel and one is rotated 180° about an axis transverse to planar member 72 to result in the stacked arrangement of FIG. 13. The stacked arrangement of panels 50, 50a, 60, 60a fits within tray 22 so as to reduce the profile of device 20 for storage.

During use of device 20, racks 24, 24a are assembled from separated panels 50, 50a, 60, 60a if not previously assembled. Bacon strips 100 can be draped over each rack 24, 24a either before racks 24, 24a are positioned in tray 22 or after. Also, one rack can be loaded with bacon strips while the rack is in tray 22, and the other rack can be loaded with bacon strips before it is positioned in tray 22. During cooking, a paper towel can be advantageously draped over device 20 and the bacon strips to reduce grease splattering. After cooking, device 20 can be handled by the user by grasping handle 36. As described above, the hot cooked bacon strips can be removed using knife 102 with knife blade 104 inserted into gap 70 below one or more bacon strips and lifted upwardly. If desired, the bacon strips can be flattened while still hot by the user. For cleanup, racks 24, 24a can be removed from tray 22. Each panel 50, 50a, 60, 60a can be separated and washed. Following cleanup, panels 50, 50a, 60, 60a can be stacked in the alternating arrangement shown in FIG. 13 and placed within tray 22.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A microwave bacon cooker device comprising:

an inverted V-shaped rack for supporting a bacon strip over a horizontal surface during cooking, the rack including first and second panels defining the V-shape, the rack including a mounting arrangement connecting the first panel to the second panel, each of the first and second panels having a top edge, the top edges of the first and second panels being spaced apart to define a gap at an apex of the V-shape, the gap sized for receipt of utensil for handling the bacon strip after cooking.

2. The microwave bacon cooker device of claim 1, wherein the first and second panels are separable, and the mounting arrangement including means for selectively mounting the first and second panels together.

3. The microwave bacon cooker device of claim 2, wherein the first and second panels are identical.

4. The microwave bacon cooker device of claim 3, wherein the means for selectively mounting includes a post and socket arrangement.

5. The microwave bacon cooker device of claim 1, further comprising a tray including a bottom and an upstanding side, the tray supporting the inverted V-shaped rack.

6. The microwave bacon cooker device of claim 5, further comprising a second inverted V-shaped rack supported by the tray.

7. The microwave bacon cooker device of claim 1, wherein the inverted V-shaped rack includes four legs.

8. The microwave bacon cooker device of claim 1, wherein the inverted V-shaped rack includes ventilation apertures within the first and second panels.

9. A microwave bacon cooker device comprising:

a tray including a bottom and an upstanding side; and two separate racks for supporting a plurality of bacon strips over the tray during cooking, each rack including first and second panels, each panel having a major planar surface, each rack having two positions relative to the tray, a cooking position wherein each major surface is at an angle relative to the bottom of tray and the rack has an inverted V-shape relative to the bottom of the tray, and a storage position wherein both major surfaces are generally parallel to the bottom of the tray, each rack including a mounting arrangement which allows separation of the first and second panels of each rack when each rack is in the storage position.

10. The microwave bacon cooker device of claim 9, wherein the first and second panels of each rack are identical.

11. A microwave bacon cooker device comprising:

an inverted V-shaped rack for supporting a bacon strip over a horizontal surface during cooking, the V-shaped rack having an apex over which the bacon is hung, the V-shaped rack having two panels defining the V-shape, each panel including a plurality of apertures through the panel; and a mounting arrangement for selectively mounting the two panels together to form the V-shape and for selectively separating the two panels from one another for cleaning and storage, the mounting arrangement including at least one post extending from one of the two panels and a reciprocally shaped socket engageable with the post, extending from the other of the two panels, the post and the socket positioned in an interior space defined by the V-shaped rack.

12. The microwave bacon cooker device of claim 11, further comprising a tray including a bottom and an upstanding side, the bottom receiving the inverted V-shaped rack.

13. The microwave bacon cooker device of claim 11, wherein the inverted V-shaped rack includes a plurality of legs.

14. A microwave bacon cooker device comprising:

a tray having a bottom and an upstanding side, the upstanding side defining a generally rectangular shape having four corners along an inner perimeter of the tray, the tray having an outer peripheral handle surrounding the upstanding side and defining a generally circular shape;

a rack received within the tray for supporting bacon strips above the bottom of the tray.

15. A microwave bacon cooker device comprising:
   a) a first panel including:
      i) a generally planar body having a front major surface and an opposite facing back major surface;
      ii) a post extending at a non-perpendicular angle from the back major surface; and
      iii) a socket spaced from the post and extending at the same general angle as the post from the back major surface; and
   b) a second panel including:
      i) a generally planar body having a front major surface and an opposite facing back major surface;
      ii) a post extending at a non-perpendicular angle from the back major surface; and
      iii) a socket spaced from the post and extending at the same general angle as the post from the back major surface, the post and the socket of the first panel engageable with the socket and the post, respectively, of the second panel to form a V-shaped rack.

16. The device of claim 15, wherein the post of each of the first and second panels includes a stop for engaging an end of the socket of the other panel.

17. The device of claim 15, wherein the body of each of the first and second panels includes a plurality of ventilation apertures extending between the front major surface and the back major surface.

18. The device of claim 15, wherein the body of each of the first and second panels includes two legs for supporting the body above a horizontal surface.

19. A method of microwave cooking bacon comprising the steps of:
   hanging a bacon strip over an inverted V-shaped rack, the rack including two panels, each panel having a top edge, the top edges spaced apart to define a gap at an apex of the V-shape;
   cooking the bacon strip hanging on the rack in a microwave oven;
   inserting a utensil between the top edges into the gap; and
   lifting the cooked bacon strip with the utensil from the rack.

20. A method of microwave cooking bacon comprising the steps of:
   providing a microwave bacon cooker device having a tray and an inverted V-shaped rack, the rack including first and second panels;
   hanging a bacon strip over the V-shaped rack having an upright vertical position relative to the tray, an apex of the V-shaped rack spaced from a bottom of the tray;
   cooking the bacon strip hanging on the rack in a microwave oven;
   removing the cooked bacon strip from the rack;
   separating the first panel of the rack from the second panel;
   cleaning each of the first and second panels and the tray;
   positioning each panel in a non-upright horizontal position; and
   positioning each panel in the non-upright horizontal position within the tray for storage.

21. The method of claim 20, farther comprising the steps of:
   providing each of the first and second panels with a major planar surface and a top and a bottom; and
   positioning one of the first and second panels relative to the other panel within the tray wherein the major planar surface of each of the first and second panels are generally parallel to one another and the top of one panel is adjacent to the bottom of the other panel.

22. A method of microwave cooking bacon comprising the steps of:
   providing two identical panels each having a major planar surface;
   mounting the panels together to form an inverted V-shaped rack;
   placing the rack in a tray;
   hanging a bacon strip over the rack;
   cooking the bacon strip hanging on the rack in a microwave oven;
   removing the cooked bacon strip from the rack;
   separating the rack into the two separate panels;
   cleaning each of the panels and the tray; and
   stacking the two panels within the tray for storage wherein the major planar surfaces are generally parallel to one another.

23. The method of claim 22, wherein four identical panels are provided, and further comprising the steps of:
   mounting the four panels together to form two inverted V-shaped racks;
   placing the two racks in the tray;
   hanging two bacon strips over the two racks, one bacon strip over each rack;
   cooking the bacon strips hanging from the racks in the microwave oven;
   removing the cooked bacon strips from the racks;
   separating the racks into four panels; and
   stacking the four panels within the tray.

* * * * *